United States Patent [19]

Suzuki

[11] Patent Number: 5,568,594
[45] Date of Patent: Oct. 22, 1996

[54] IMAGE FORMING APPARATUS WITH IMPROVED ABILITY TO EMULATE OTHER IMAGE FORMING APPARATUSES

[75] Inventor: Kazuhisa Suzuki, Kanagawa-ken, Japan

[73] Assignee: Kabushiki Kaisha Toshiba, Kanagawa-Ken, Japan

[21] Appl. No.: 287,113

[22] Filed: Aug. 28, 1994

Related U.S. Application Data

[63] Continuation of Ser. No. 854,174, Mar. 25, 1992, abandoned.

[30] Foreign Application Priority Data

Apr. 8, 1991 [JP] Japan .................................. 3-103139

[51] Int. Cl.⁶ .................................................... G06K 15/00
[52] U.S. Cl. ............................. 395/112; 364/DIG. 1; 364/DIG. 2; 364/235; 364/235.6; 364/930; 364/930.5
[58] Field of Search ................... 364/DIG. 1 MS File, 364/DIG. 2 MS File; 395/106, 112, 500

[56] References Cited

U.S. PATENT DOCUMENTS

| | | | |
|---|---|---|---|
| 4,926,347 | 5/1990 | Uchida et al. | 395/112 |
| 4,968,159 | 11/1990 | Sasaki et al. | 400/76 |
| 4,992,957 | 2/1991 | Aoyama et al. | 364/519 |
| 4,994,988 | 2/1991 | Yokoi | 395/112 |
| 5,043,918 | 8/1991 | Murahashi | 364/519 |
| 5,047,957 | 9/1991 | Ikenoue | 364/519 |
| 5,075,874 | 12/1991 | Steeves et al. | 395/112 |
| 5,165,014 | 11/1992 | Vasaar | 395/112 |

FOREIGN PATENT DOCUMENTS

| | | | |
|---|---|---|---|
| 0096407 | 12/1983 | European Pat. Off. | 395/112 |
| 1-18640 | 1/1989 | Japan . | |
| 1018640 | 1/1989 | Japan | 395/112 |
| 2-216521 | 8/1990 | Japan . | |
| 4059268 | 2/1992 | Japan | 395/112 |

OTHER PUBLICATIONS

European Search Report Mar. 8, 1993.

*Primary Examiner*—Robert B. Harrell
*Attorney, Agent, or Firm*—Limbach & Limbach

[57] ABSTRACT

A printer which has selectable emulations. The printer includes a buffer memory for temporarily storing image data supplied from the host unit and an image forming device for forming an image on an image bearing member according to the image data. A first key is provided for changing the printer emulation. A second key is provided for holding the image data when the printer emulation is changed. A third key is provided for erasing the image data when the emulation is changed.

2 Claims, 6 Drawing Sheets

OPTION TABLE

| OPTION | PRESET VALUE | OTHER VALUES |
|---|---|---|
| COPIES | 1 | 1 TO 99 |
| PAPER | UPPER | LOWER MANUAL FEED |
| EMULATION | EMU - 12 | EMU - 630 EMU - 1350 |
| FONT | CART - 1 | CART - 2 CART - 3 |
| ... ... | ... ... | ... ... |
| ... ... | ... ... | ... ... |

Fig 5

IMAGE FORMING APPARATUS WITH IMPROVED ABILITY TO EMULATE OTHER IMAGE FORMING APPARATUSES

This is a continuation of application Ser. No. 07/857,174 filed on Mar. 25, 1992, now abandoned.

BACKGROUND OF THE INVENTION

1. Field of the Invention

This invention relates to an image forming apparatus, such as a laser printer, for forming an image on an image bearing member according to data supplied from a host unit and, more particularly, to an image forming apparatus compatible with other kinds of image forming apparatuses.

2. Description of the Related Art

Recently, in an image forming apparatus for forming an image on an image bearing member, a laser printer has been developed and put into practical use. For example, U.S. Pat. No. 4,681,425 discloses this laser printer design. The laser printer serves as an output device for a host unit. Also, the laser printer includes a buffer memory for temporarily storing image data supplied from the host unit. In response to a printer command from the host unit, the laser printer performs an image forming operation to form an image on the image bearing member according to image data stored in the buffer memory.

Also, in addition to image data supplied from the host unit, this laser printer receives a printer control language which is adapted for operating the laser printer. For example, the printer control language represents such things as where to draw a box or a circle, when to start printing and so on. However, different kinds of laser printers have their own printer control language. Thus, in order to make the laser printer compatible with other laser printers, the laser printer is designed with its own native printer control language and also with the ability to emulate other laser printers. This function is called an emulation or a printer emulation. Thus, this laser printer may emulate the printing operation of other kinds of laser printers by selecting the printer emulation of the laser printer.

In a conventional laser printer, when an operator changes the printer emulation so as to emulate another printer according to the image data supplied from the host unit which is stored in the buffer memory, the stored image data always is erased from the buffer memory. Thus, when the operator wants to print the erased image data after the printer emulation is changed, it is necessary to receive the same image data from the host unit again. Therefore, in the conventional laser printer, it is very troublesome to print the image data stored in the buffer memory before the printer emulation is changed.

SUMMARY OF THE INVENTION

Accordingly, it is an object of the present invention to provide a printer having a printer emulation mode which is capable of printing image data Stored in a buffer memory of the printer efficiently when a printer emulation is changed.

It is a further object of the present invention to provide an image forming apparatus which is capable of holding image data stored in a memory when the emulation of the image forming apparatus is changed.

Accordingly, the foregoing objectives, as well as others, are achieved by the present invention, which provides an image forming apparatus for forming an image on an image bearing member according to image data supplied from a host unit. The image forming apparatus is capable of selecting a printer emulation to emulate the image forming operation of other kinds of image forming apparatuses. The image forming apparatus comprises a buffer memory for temporarily storing the image data supplied from the host unit, first designating means for designating the alternation of the printer emulation and second designating means for designating the holding of the image data stored in the buffer memory when the printer emulation is changed, changing means for changing the printer emulation in response to an instruction from the first designating means and holding means for holding the image data stored in the buffer memory in response to an instruction from the second designating means when the printer emulation is changed by the changing means.

A further aspect of the present invention provides an image forming apparatus for forming an image on an image bearing member according to image data supplied from a host unit. The image forming apparatus also is capable of selecting a printer emulation to emulate the image forming operation of other kinds of image forming apparatuses. The image forming apparatus comprises a buffer memory for temporarily storing the image data supplied from the host unit, first designating means for designating the alternation of the printer emulation, second designating means for designating the holding of the image data stored in the storing means when the printer emulation is changed, third designating means for designating the erasing of the image data stored in the storing means when the printer emulation is changed; changing means for changing the printer emulation in response to an instruction from the first designating means, holding means for holding the image data stored in the storing means in response to an instruction from the second designating means when the printer emulation is changed by the changing means and erasing means for erasing the image data stored in the storing means in response to an instruction from the third designating means when the printer emulation is changed by the changing means.

BRIEF DESCRIPTION OF THE INVENTION

A more complete appreciation of the present invention and many of the attendant advantages thereof will be readily obtained as the invention becomes better understood by reference to the following detailed description, when considered in connection with the accompanying drawings, wherein.

DETAILED DESCRIPTION OF THE PREFERRED EMBODIMENTS

Figure 1:
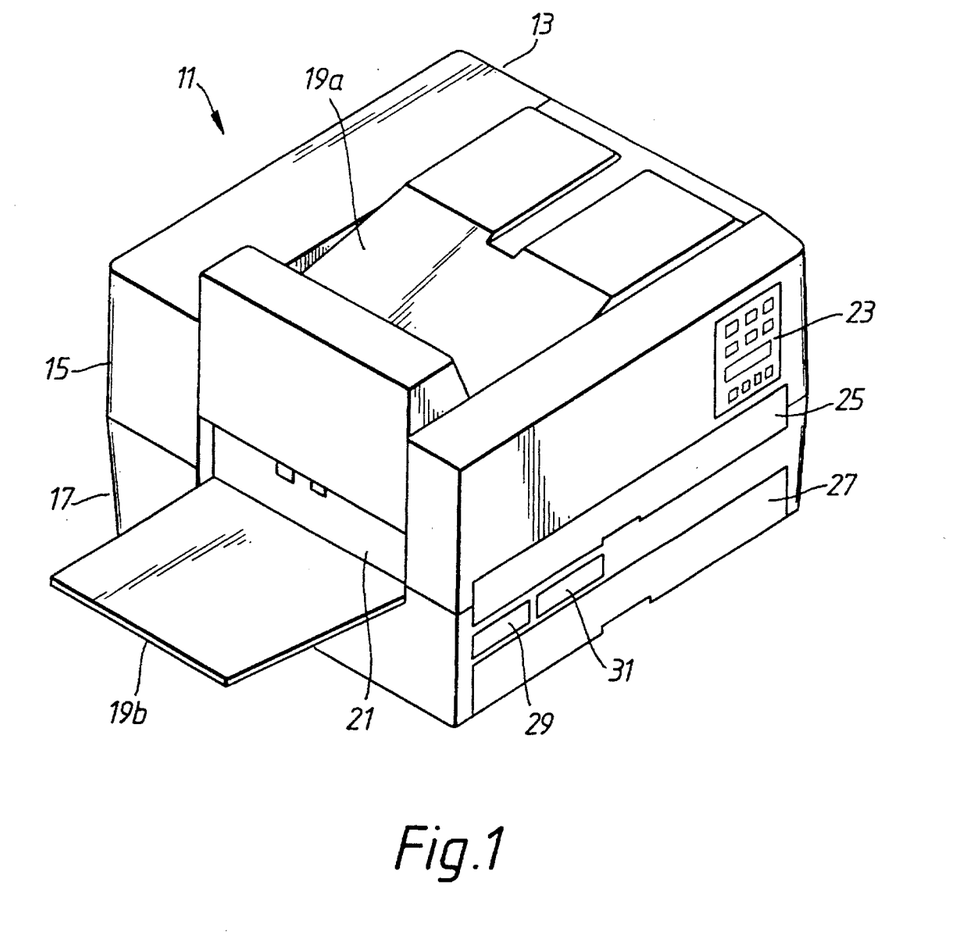
FIG. 1 is a perspective view of an image forming apparatus according to the present invention.
Figure 4:
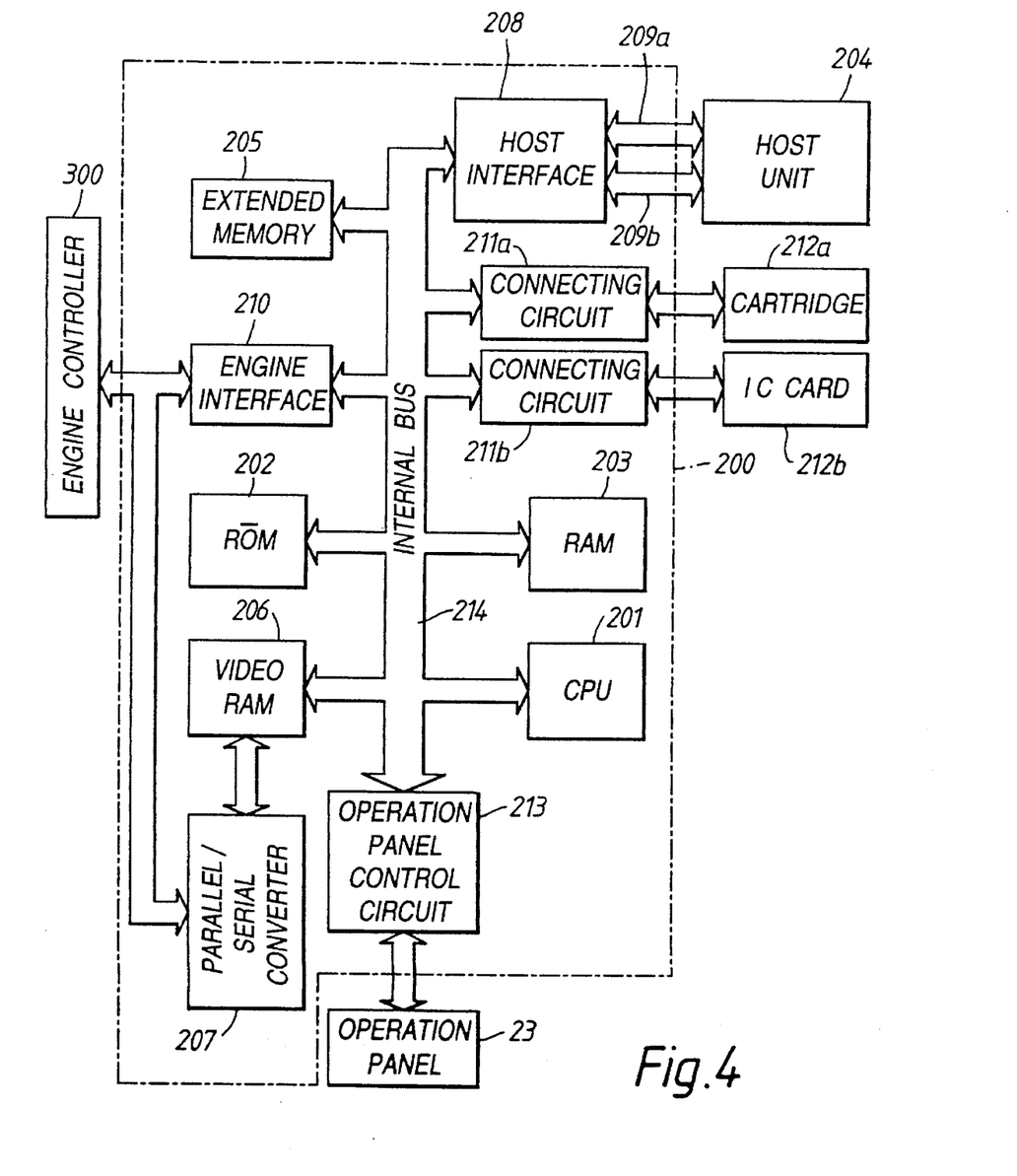
FIG. 4 is a block diagram showing an arrangement of a printer controller of the image forming apparatus shown in FIG. 2.

FIG. 1 shows an image forming apparatus according to the present invention. The image forming apparatus may be, of course, one of a wide variety known in the prior art. For example, the image forming apparatus depicted is a laser printer. Laser printer 11 may serve as an output device for a host unit 204 as shown in FIG. 4, for example, a personal computer or an image reading apparatus. In response to a print command from host unit 204, laser printer 11 performs an image forming operation to form an image on a paper sheet according to data supplied from host unit 204. The paper sheet is fed to a user via trays 19*a*, 19*b*.

Laser printer 11 includes a body 13 having an upper cover 15 and a lower frame 17. Upper cover 15 covers a part of the upper portion of body 13. Upper cover 15 is mounted by a hinge to body 13 and may be opened away from frame 17.

A first output tray 19*a* is located on the upper portion of body 13 to receive printed paper sheets output from laser printer 11. A recess 21 used as a paper sheet discharge section is formed on the front surface of body 13. A second output tray 19*b* is located on the bottom edge portion of recess 21, so that second output tray 19*b* may receive printed paper sheets through recess 21. An operation panel 23 is located on a surface portion of body 13.

First and second paper supply cassettes 25 and 27 are inserted into a lower portion of body 13. For purpose of reference, the side of printer 11 into which cassettes 25 and 27 are inserted will hereinafter be referred to as the front side of printer 11. Cassettes 25 and 27 hold a supply of paper sheet P.

Connectors 29 and 31 are also located on a surface portion of body 13. A programming cartridge, for example, an emulation cartridge, a IC card or the like (not shown) may be plugged into connectors 29 and 31 for programming special printer functions.

Operation panels 23 includes a plurality of visual displays, for example, light emitting diodes and a status indicator for indicating the operating status of printer 11.

Figure 2:
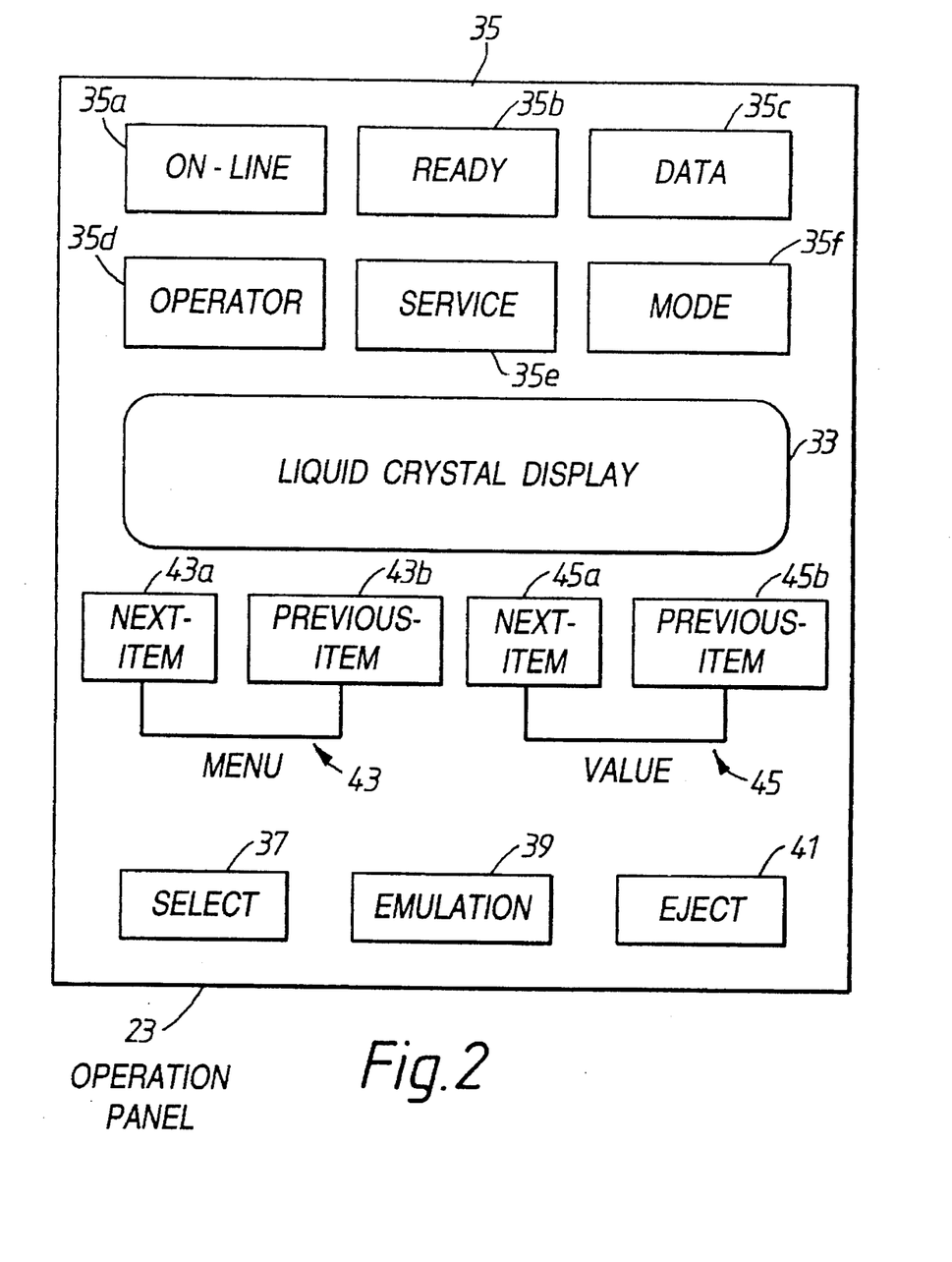
FIG. 2 is a plan view showing an operation panel of the image forming apparatus shown in FIG. 1.
Figure 3:
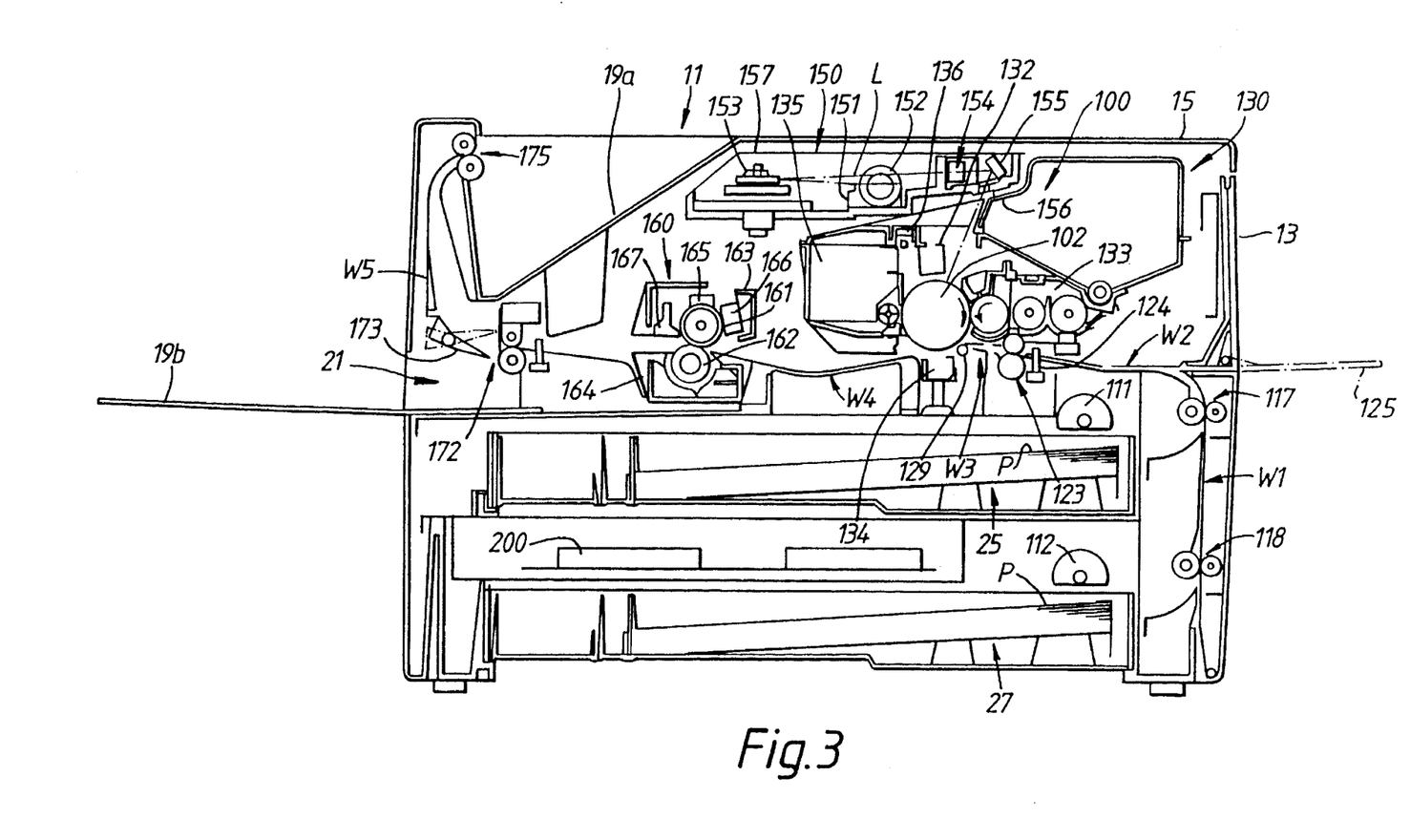
FIG. 3 is a sectional view of the image forming apparatus shown in FIG. 1.

Referring to FIG. 2, operation panel 23 includes a liquid crystal display element 33 and a LED display unit 35. Liquid crystal display element 33 displays the number of paper sheets P, a selected operation mode, message information and so on. LED display unit 35 displays various states in light fashion. LED display unit 35 has an ON-LINE display portion 35*a*, a READY display portion 35*b*, a DATA display portion 35*c*, an OPERATOR display portion 35*d*, a SERVICE display portion 35*e*, and a MODE display portion 35*f*. ON-LINE display portion 35*a* indicates that laser printer 11 is on-line. READY display portion 35*b* indicates that the power is on and laser printer 11 is ready to print. DATA display portion 35*c* comes on while laser printer 11 is receiving printable data. OPERATOR display portion 35*d* comes on when something is wrong. SERVICE display portion 35*e* comes on when printer 11 requires service by a trained technician. Also, MODE display portion 35*f* indicates that printer 11 expects the operator to manually insert single paper sheets using a manual feeding tray 125 as shown in FIG. 3.

Operation panel 23 also includes a SELECT key 37, an EMULATION key 39 and an EJECT key 41. SELECT key 37 causes laser printer 11 to activate or deactivate communication with host unit 204. EMULATION key 39 lets an operator change the printer emulation of laser printer 11. Eject key 41 causes printer 11 to print and eject the currently stored data in a buffer memory (RAM) 203 as shown in FIG. 4. Also, eject key 41 is used for erasing data stored in buffer memory 203 when the printer emulation of laser printer 11 is changed.

Operation panel 23 further has a MENU key portion 43 and a VALUE key portion 45. MENU key portion 43 and VALUE key portion 45 let the operator select various operation modes. The operator views and sets an operation mode by using MENU key portion 43 and VALUE key portion 45. These operation modes include pitch, font, margins, type of printer emulation, number of copies and so on. Each of the operation modes has two or more values the operator can set. Thus, the operator selects the operation mode by using MENU key portion 43 and sets its value by using VALUE key portion 45. MENU key portion 43 has a menu next-item key 43*a* and a menu previous-item key 43*b*. Also, VALUE key portion 45 has a value next-item key 45*a* and a value previous-item key 45*b*.

For example, a plurality of menu information for representing the operation modes are stepped forward through an operation mode list (not shown) by pressing menu next-item key 45*a* and are stepped backward through the operation mode list by pressing menu previous-item key 43*b*. Also, the selected menu information is displayed on a left half of liquid crystal display element 33 and these display operations are repeated in cyclic fashion. Moreover, a plurality of value information corresponding to the selected menu information are stepped forward by pressing value next-item key 45*a* and are stepped backward by pressing value previous-item key 45*b*. The selected value information is displayed on a right half of liquid crystal display element 33. By operating menu next-item key 43*a*, menu previous-item key 43*b*, value next-item key 45*a* and value previous-item key 45*b*, the operator selects a desired operation mode and the values associated with the selected operation mode.

Referring now to FIG. 3, the internal construction of laser printer 11 will be described.

An image forming unit 100 includes an image bearing member 102, i.e., a photosensitive drum for forming a latent image in response to a light. Image bearing member 102 is rotated by an electric motor (not shown). A laser unit radiates a laser beam L so that a latent image is formed on the surface of image bearing member 102.

Laser unit 150 includes a semiconductor laser 151 for generating laser beam L in response to data supplied from host unit 204. Laser beam L is directed to a polygonal mirror 153 via a condenser lens 152. Polygonal mirror 153 reflects laser beam so that laser beam L scans the surface of image bearing member 102 through first and second lenses 154 and 155 and a third lens 156. Laser unit 150 is mounted in a casing 157 which may be made of synthetic resin.

A developing unit 133 is located adjacent image bearing member 102. Developing unit 133 develops the latent image with a toner in order to form a visible image.

A transfer unit 134 is located down stream of developing unit 133 along the rotational direction of image bearing member 102. At the image transfer position, transfer unit 134 faces image bearing member 102. Transfer unit 134 transfers the toner image onto paper sheet P supplied from cassettes 25 and 27.

A cleaning unit 135 is located down stream of transfer unit 134 along the rotational direction of image bearing member 102. Cleaning unit 135 cleans the surface of image bearing member 102 so as to remove the residual toner after transfer of the toner image by transfer unit 134.

A discharging unit 136 and a charging unit 132 are located down stream of laser unit 150 along the rotational direction of image bearing member 102. Discharging unit 136 includes a lamp (not shown) for radiating the surface of image bearing member 102 in order to set the electrical potential of the surface of image bearing member 102 to a predetermined uniform level. After the electrical potential of the surface of image bearing member 102 is set, charging unit 132 charges the entire surface of image bearing member 102 in order to prepare the surface for forming a latent image.

Image bearing member 102, developing unit 133, cleaning unit 135, discharging unit 136 and charging unit 132 are mounted in a processing unit 130 as a single body. Processing unit 130 is detachably mounted into body 13.

A printer controller 200 for controlling the image forming operation or, laser printer 11 is provided between first cassette 25 and second cassette 27.

Pickup rollers 111 and 112 are respectively provided at the top ends of cassettes 25 or 27 when cassettes 31 and 32 are inserted into body 13 of laser printer 11. Pickup rollers 111 and 112 have a semicircular cross-section and are provided with flat surfaces. Paper sheet P, when picked up from cassettes 25 or 27, is then transported to an image transfer position through a first feeding path W1, a second feeding path W2 and a third feeding path W3. First feeding path W1 is arranged near to cassettes 25 and 27. First feeding path W1 comprises two pairs of conveying rollers 117 and 118. Second feeding path W2 for feeding paper sheet P towards the image transfer position is arranged downstream of first feeding path W1. Second feeding path W2 comprises a pair of aligning rollers 123. Aligning switch 124 for detecting the passage of paper sheet P is arranged upstream of aligning rollers 123. Third feeding path W3 is located downstream of aligning rollers 123 for guiding paper sheet P to the image transfer position. Third feeding path W3 includes a transfer guide roller 129.

Laser printer 11 may also include a manual feeding tray 125 inserted into the left side of body 13 and shown by dashed lines in FIG. 3. Manual feeding tray 125 is used as a guide for manually feeding individual paper sheets for printing.

A fixing unit 160 is located down stream of the image transfer position. Fixing unit 160 fixes the toner image onto paper sheet P $b_y$ heating and pressing paper sheet P with the toner image. Fixing unit 160 comprises a heating roller 161 and a pressing roller 162 for pressing against heating roller 161. Heating roller 161 and pressing roller 162 are enclosed by an upper casing 163 and a lower casing 164 to maintain the proper temperature for fixing the toner image on paper sheet P. A cleaner 165 for cleaning the surface of heating roller 161, a thermistor 166 for detecting the surface temperature of heating roller 161 and a separation guide 167 for ensuring reliable separation of paper sheet P from heating roller 161 are respectively arranged around the heating roller 161.

A fourth path W4 is located between the image transfer position and fixing unit 160. Paper sheet P from image transfer position is transported to fixing unit 160 along fourth path W4.

An eject path W5 is located down stream of fixing unit 160. Eject path W5 ejects paper sheet P with the fixed toner image onto receiving tray 19a or 19b. Eject path W5 comprises first pair of paper eject rollers 172, gate 173 and second pair of paper eject rollers 175. Gate 173 selects the eject position of paper sheet P with the fixed toner image. Thereby, paper sheet P is transported from cassettes 25, 27 or manual feeding tray 125 to output trays 19a or 19b.

FIG. 4 shows an arrangement of a main part of printer controller 200.

Referring to FIG. 4, printer controller 200 includes a CPU 201 for performing an overall control of laser printer 11, and a memory (ROM) 202 for storing a control program with respect to the printing operation, the printer emulation and so on. CPU 201 is operated in accordance with the control program stored in ROM 202. Buffer memory (RAM) 203 temporarily stories image data supplied from host unit 204. An extended memory 205 stores image data when one-page data may not be stored in RAM 203. A video RAM 206 stores bit map data corresponding to image data supplied from host unit 204. The bit Map data output from video RAM 206 is supplied to a parallel/serial converter 207. Parallel/serial converter 207 converts the supplied bit map data into serial data, and then the serial data is supplied from parallel/serial converter 207 to an engine controller 300 which controls the image forming operation of laser printer 11.

A host interface 208 interfaces data exchange between host unit 204 and printer controller 200. Host interface 208 includes a serial transfer line 209a and a parallel transfer line 209b. Transfer lines 209a and 209b may be selectively used in accordance with the type of data transferred from host unit 204. An engine interface 210 interfaces exchange of an interface signal between printer controller 200 and engine controller 300. Connecting circuits 211a and 211b disconnect power sources (not shown) and signal lines (not shown) from a cartridge 212a and an IC card 212b so that the programming stored in cartridge and data stored in IC card 212b may is not destroyed by noise when cartridge 212a and IC card 212b respectively are inserted into or removed from connectors 29 and 31.

An operation panel control circuit 213 controls the liquid crystal display element 33 of operation panel 23 and so on. An internal bus 214 allows data exchange between CPU 201, ROM 202, RAM 203, extended memory 205, video RAM 206, host interface 208, engine interface 210, connecting circuits 211a and 211b and operation panel control circuit 213.

Figure 5:
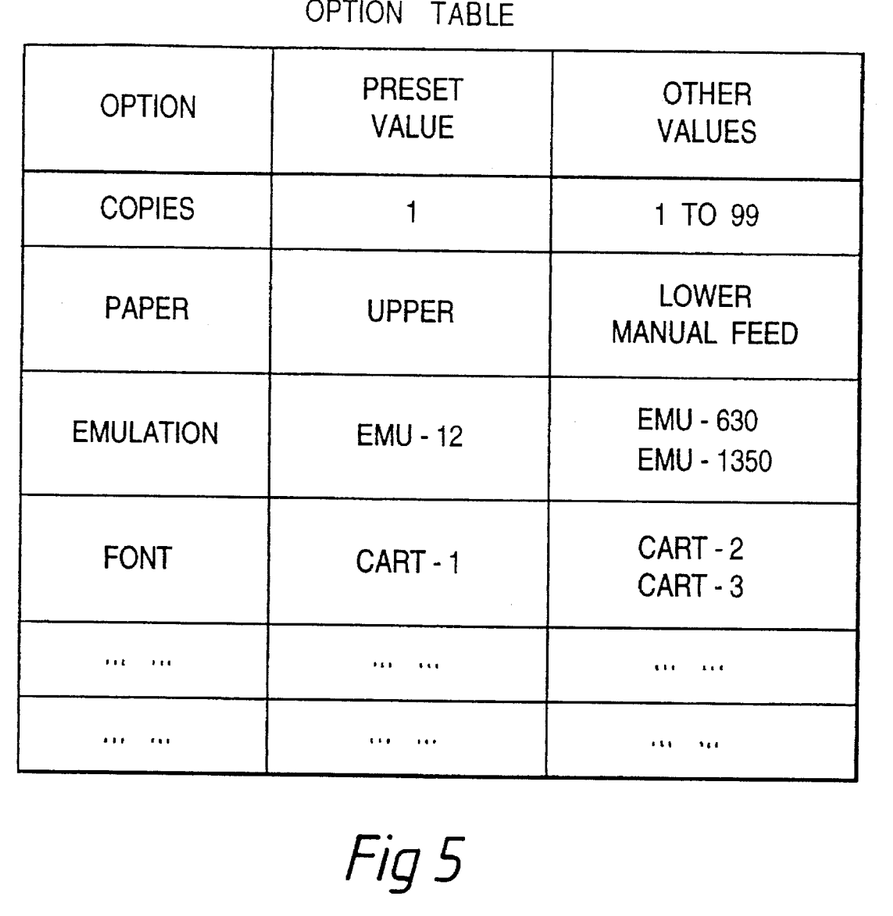
FIG. 5 shows a table stored in a buffer memory of the printer controller shown in FIG. 4.

In the present embodiment, ROM 202 also stores a table which summarizes the operation modes in the order that they appear in LCD element 33 as shown in FIG. 5. In this table, the left column identifies the name of the operation mode. The middle column identifies the factory preset values for each operation modes and the right column identifies the other values. For example, with respect to EMULATION, this function selects the printer emulation and the operator may select one of EMU-12, EMU-630 and EMU-1350 with respect to the printer emulation (where EMU-12, EMU-630 and EMU-1350 respectively represent the name of the printer emulation).

Figure 6:
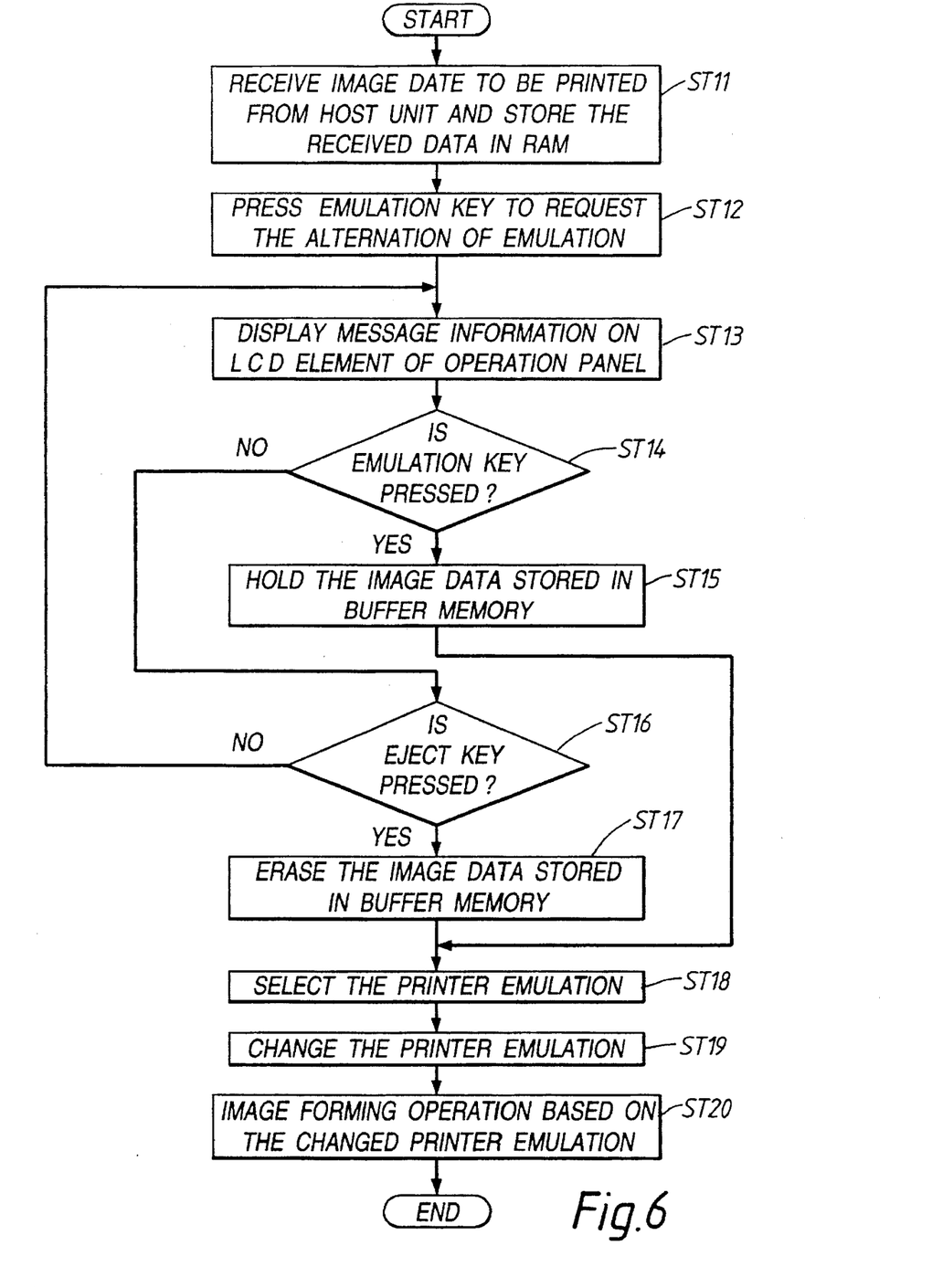
FIG. 6 is a flow chart showing an operation of the image forming apparatus shown in FIG. 1.

Next, the changing operation of the printer emulation of laser printer 11 will be described with reference to FIG. 6.

The printer emulation of laser printer 11 is changed to another emulation when the operator designates the desired emulation by operating value keys 45a and 45b of operation panel 23 or by inserting the emulation cartridge in connector 29 of laser printer 11. When the operator designates the desired emulation by operating value keys 45a and 45b, the printer emulation may change to any other emulation included in the table stored in ROM 202 as shown in FIG. 5. In order to hold or erase the image data stored in RAM 203 when the printer emulation is changed, laser printer 11 may perform the following operation.

When printer controller 200 receives image data to be printed from host unit 204, the image data is stored in RAM 203 (step ST11). When the image data is stored in RAM 203, the operator presses EMULATION key 39 of operation panel 23 in order to request alternate printer emulations of laser printer 11 (step ST 12). CPU 201 receives this request through operation panel control circuit 213. When CPU 201 receives the emulation change request, CPU causes LCD element 33 of operation panel 23 to display message information requesting whether the operator wants to hold the image data stored in RAM 203 (step ST 13). For example, the message information is sequentially displayed on LCD element 33 in such a manner as "THE DATA IS STORED. PLEASE PRESS THE EJECT KEY IF YOU WANT TO ERASE THE DATA. PLEASE PRESS THE EMULATION KEY IF YOU WANT TO HOLD THE DATA.". Thus, in the present embodiment, if the operator wants to print the image data stored in RAM 203 after the printer emulation is changed, the operator presses EMULATION key 39 so as to hold the image data (step ST 14). Also, when the operator does not need the image data stored in RAM 203, the operator presses EJECT key 41 in order to erase the image data from RAM 203 (step ST16). When the operator presses EMULATION key 39, operation panel control circuit 213 supplies a first request signal for holding the image data to CPU 201, and then CPU 201 performs the operation to hold the image data stored in RAM 203 in response to the first request signal (step ST15). Also, when the operator presses EJECT key 41, operation panel control circuit 213 supplies a second request signal for erasing the image data to CPU 201, and then CPU 201 performs the operation to erase the image data stored in RAM 203 in response to the second request signal (step ST17).

In this state, the operator selects the desired printer emulation within the emulations included in the table as shown in FIG. 5 by value next-item key 45a and value previous-item key 45b or the operator may change the printer emulation by putting the emulation cartridge in connector 29 of laser printer 11 (step ST 18). CPU 201 changes the printer emulation of laser printer 11 in accordance with the selected emulation (step ST 19). Then, laser printer 11 performs the image forming operation based on the selected printer emulation (Step ST 20). Thus, the operator may easily hold the image data stored in buffer memory 203 when the emulation is changed. Therefore, even if the operator wants to print the image data stored in buffer memory 203 before the emulation is changed, it is not necessary to receive the same image data from host unit 204 after the emulation is changed. Also, the operator may easily erase the image data stored in buffer memory 203 when the operator does not need the stored image data after the emulation is changed.

Thereby, in the present invention, the image forming apparatus of the present invention may print image data stored in the image forming apparatus efficiently when the emulation of the image forming apparatus is changed.

It should be understood that the detailed description and examples, while indicating presently preferred embodiments of the present invention, are given by way of illustration only. Various modifications and changes may be made to the present invention without departing from scope or spirit of the invention, as set forth in the following claims.

I claim:

1. A printing apparatus having an image bearing member and connected to a host unit for printing an image on the image bearing member according to image data supplied from the host unit, the printing apparatus having selectable printer emulations to thereby emulate other printers, the printing apparatus comprising:

storing means for temporarily storing the image data supplied from the host unit;

first key means for selecting an alternate printer emulation;

second key means for selecting a hold of the image data stored in the storing means when the printer emulation is changed;

third key means for selecting an erasure of the image data stored in the storing means when the printer emulation is changed;

connecting means for receiving a cartridge having a program thereon defining one or more alternate printer emulations;

display means for displaying a message regarding holding the image data stored in the storing means in response to the first key means;

changing means for changing the printer emulation in response to the first key means and the connecting means;

means for holding the image data stored in the storing means in response to the second key means when the printer emulation is changed by the changing means; and means for erasing the image data stored in the storing means in response to the third key means when the printer emulation is changed by the changing means.

2. An image forming apparatus according to claim 1 further comprising operation panel means for designating a plurality of operation modes, wherein the operation panel means has the first designating means, the second designating means, the third designating means and the displaying means.

* * * * *